United States Patent
Plantenga et al.

(10) Patent No.: US 6,923,904 B1
(45) Date of Patent: *Aug. 2, 2005

(54) PROCESS FOR EFFECTING ULTRA-DEEP HDS OF HYDROCARBON FEEDSTOCKS

(75) Inventors: Frans Lodewijk Plantenga, Amersfoot (NL); Franciscus Wilhelmus Van Houtert, Amsterdam (NL); Johannes Wilhelmus Maria Sonnemans, Amersfoort (NL)

(73) Assignee: Akso Nobel N.V., Arnhem (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/540,400

(22) Filed: Mar. 31, 2000

Related U.S. Application Data
(60) Provisional application No. 60/127,778, filed on Apr. 5, 1999.

(30) Foreign Application Priority Data

Apr. 2, 1999 (EP) ............................................ 99201016

(51) Int. Cl.$^7$ ......................... C10G 45/08; C10G 45/02
(52) U.S. Cl. .................. 208/216 R; 208/217; 208/237; 208/240; 208/243; 208/244; 208/208 R
(58) Field of Search ............................. 208/216 R, 217, 208/237, 240, 243, 244, 208 R

(56) References Cited

U.S. PATENT DOCUMENTS

| | | | |
|---|---|---|---|
| 4,028,227 A | | 6/1977 | Gustafson .................... 208/216 |
| 4,845,068 A | | 7/1989 | Takahashi et al. ........... 502/168 |
| 5,162,281 A | * | 11/1992 | Kamo et al. ................. 502/168 |
| 5,468,709 A | * | 11/1995 | Yamaguchi et al. ......... 502/210 |
| 6,280,610 B1 | * | 8/2001 | Uragami et al. ......... 208/216 R |
| 6,540,908 B1 | * | 4/2003 | Eijsbouts et al. ....... 208/216 R |
| 2002/0070147 A1 | * | 6/2002 | Sonnemans et al. ........ 208/210 |

FOREIGN PATENT DOCUMENTS

| | | | |
|---|---|---|---|
| EP | 0 357 295 | 11/1988 | ........... C10G/65/04 |
| EP | 0 464 931 | 1/1992 | ........... C10G/65/08 |
| EP | 0 523 679 | 1/1993 | ........... C10G/65/04 |
| EP | 0 289 211 | 9/1993 | ........... B01J/31/02 |
| EP | 0 601 722 | 6/1994 | ........... C10G/45/08 |
| EP | 0 842 701 | 5/1998 | ............ B07J/37/20 |
| EP | 0 870 817 | 10/1998 | ........... C10G/65/04 |
| WO | WO 96/41848 | 12/1996 | ........... C10G/45/08 |

OTHER PUBLICATIONS

*European Search Report*, dated May 23, 2000.
*Ultra Low Sulfur Diesel: Catalyst and Process Options*, Tom Tippet, et al,, NPRA 1999 Annual Meeting, 18 pgs.,—no month.
*Derwent Abstract*, EP842701–A, dated May 20, 1998.
*Derwent Abstract*, JP06339635–A, dated Dec. 13, 1994.
*Derwent Abstract*, JP04166233–A, dated Jun. 12, 1992.
*Derwent Abstract*, JP06210182–A, dated Aug. 2, 1994.
*Derwent Abstract*, JP04166231–A, dated Jun. 12, 1992.

\* cited by examiner

*Primary Examiner*—Walter D. Griffin
(74) *Attorney, Agent, or Firm*—Louis A. Morris

(57) ABSTRACT

The invention pertains to a process for reducing the sulfur content of a hydrocarbon feedstock to a value of less than 200 ppm, preferably less than 50 ppm, which comprises subjecting a catalyst comprising a Group VIB metal component, a Group VIII metal component, and an organic additive on a carrier to a sulfidation step, and contacting a feedstock with a 95% boiling point of 450° C. or less and a sulfur content of 500 ppm or less with the sulfided catalyst under conditions of elevated temperature and pressure to form a product with a sulfur content of less than 200 ppm. The organic additive preferably is at least one compound selected from the group of compounds comprising at least two hydroxyl groups and 2–10 carbon atoms, and the (poly)ethers of these compounds.

7 Claims, No Drawings

PROCESS FOR EFFECTING ULTRA-DEEP HDS OF HYDROCARBON FEEDSTOCKS

CROSS REFERENCE TO RELATED APPLICATIONS

The present application claims priority of European Patent Application No 99201016.5, filed on Apr. 2, 1999 and U.S. Provisional Patent Application No. 60/127,778, filed on Apr. 5, 1999.

BACKGROUND OF THE INVENTION

1. Field of the Invention

The present invention relates to a process for effecting ultra-deep hydrodesulfurization (HDS) of hydrocarbon feedstocks.

2. Prior Art

In an effort to regulate $SO_2$ emissions from the burning of fuels and to optimise the performance of tail-end catalysts, in particular exhaust treatment catalysts, the regulations as to the sulfur content of fuels, in particular diesel fuels, are becoming more and more strict. In Europe diesel feedstocks will be required as of 2000 to have a sulfur content below 350 ppm, while as of 2005, the sulfur content should be below 50 ppm, with even further decreases not being excluded.

Consequently, there is an increasing need for catalyst systems which can decrease the sulfur content of a hydrocarbon feedstock with a 95% boiling point of 450° C. or less to below 200 ppm, preferably below 100 ppm, even more preferably below 50 ppm, calculated by weight as elemental sulfur on the total liquid product.

In the context of the present specification the term ultra-deep HDS means the reduction of the sulfur content of a hydrocarbon feedstock to a value of less than 200 ppm, preferably less than 100 ppm, and even more preferably to a value of less than 50 ppm, calculated by weight as elemental sulfur on the total liquid product, as determined in accordance with ASTM D4294. The indications Group VIB and Group VIII correspond to the Periodic Table of Elements applied by Chemical Abstract Services (CAS system).

The problem associated with effecting this ultra-deep HDS is that the only sulfur compounds still present in the feed are those which are very difficult to remove. Depending on their source, petroleum fractions can comprise various types of sulfur compounds. In middle distillate fractions, the major sulfur components are benzothiophenes and dibenzothiophenes. In straight-run materials significant quantities of other components are present, such as thiophenes, mercaptanes, sulfides and disulfides. Of these, the sulfides and disulfides are the most reactive, followed by the thiophenes, benzothiophenes, and dibenzothiophenes. Within the group of dibenzothiophenes some components are more reactive than others. In consequence, in conventional HDS, in which the sulfur level is reduced to a value of, say, about 0.3 wt. %, the sulfides and thiophenes are removed. In deep HDS, to a sulfur level of, say, 200–500 ppm, the benzothiophenes are removed. The only compounds remaining then are a limited number of alkylated benzothiophenes, with the alkyldibenzothiophenes which have the alkyl on the 4- or 6-position being particularly difficult to remove.

It has also been found that the reaction mechanisms by which these very refractive sulfur compounds are decomposed is different from that by which the less refractive compounds are decomposed. This is evidenced, e.g., by the fact that the catalysts which are known as particularly suitable for HDS appear to function less well in ultra-deep HDS. For example, conventionally cobalt-molybdenum catalysts are more active in HDS than nickel-molybdenum catalysts. However, for ultra-deep HDS it has been found that nickel-molybdenum catalysts show better results than cobalt-molybdenum catalysts. Reference is made to the paper entitled "Ultra low sulfur diesel: Catalyst and Process options" presented at the 1999 NPRA meeting by T. Tippet, et al.

The consequence of this difference in reaction mechanisms implies that the refiner who is faced with having to produce material with a lower sulfur content cannot just apply his usual hydrodesulfurization catalyst under more stringent conditions. On the contrary, he will have to specifically select the hydrotreating catalyst which is most effective in effecting ultra-deep HDS. This is the more so since the reaction conditions necessary to effect ultra-deep HDS are rather severe in themselves, and the use of a better catalyst makes it possible to select less severe reaction conditions, resulting in energy saving and a longer catalyst lifespan.

We have found that a catalyst which before sulfidation comprises a Group VIB metal component, a Group VIII metal component, and an organic additive is very efficient in reducing the sulfur content of a hydrocarbon feedstock to a value of less than 200 ppm. Additionally, it has appeared that this catalyst makes it possible to effect ultra-deep HDS in combination with improved nitrogen removal, total aromatics removal, and removal of polynuclear aromatics.

SUMMARY OF THE INVENTION

In brief summary, the present invention, in one embodiment, is directed to a process for reducing the sulfur content of a hydrocarbon feedstock to a value of less than 200 ppm, comprising subjecting a catalyst comprising a Group VIB metal component, a Group VIII metal component, and an organic additive on a carrier to a sulfidation step, and contacting a feedstock with a 95% boiling point of 450° C. or less and a sulfur content of 500 ppm or less with the sulfided catalyst under conditions of elevated temperature and pressure to form a product with a sulfur content of less than 200 ppm.

In another embodiment, the present invention is directed to a two-step process for converting a starting feedstock having a sulfur content of above 0.1 wt. % into a product having a sulfur content of 200 ppm or less, wherein the process comprises sulfidation of a first and a second catalyst comprising a Group VIB metal component, a Group VIII metal component, and an organic additive on a carrier, contacting a feedstock with a 95% boiling point of 450° C. or less and a sulfur content of 0.1 wt. % or more with the first sulfided catalyst under conditions of elevated temperature and pressure to form a product with a sulfur content of less than 500 ppm, and contacting the effluent from the first catalyst, optionally after fractionation or intermediate phase separation, with the second sulfided catalyst under conditions of elevated temperature and pressure to form a product with a sulfur content of less than 200 ppm.

Other embodiments of the invention encompass details about feedstocks, catalyst and additive compositions, etc., all of which are hereinafter disclosed in the following discussion of each of the facets of the present invention.

DETAILED DESCRIPTION OF THE INVENTION

The Catalyst

Catalysts comprising a Group VIB metal component, a Group VIII metal component, and an organic additive are known to the art.

For example, European patent application 0 601 722 describes a process for preparing a catalyst in which a gamma-alumina support is impregnated with an impregnation solution comprising a Group VIB metal component, a Group VIII metal component, and an organic additive which is at least one compound selected from the group of compounds comprising at least two hydroxyl groups and 2–10 carbon atoms, and the (poly)ethers of these compounds.

WO 96/41848 describes a process in which an additive-containing catalyst is prepared by incorporating the additive mentioned above into a finished catalyst composition. That is, a catalyst composition comprising hydrogenation metal components in the oxidic form, brought into that form by calcination, is contacted with the specified additive.

Japanese patent application 04-166231 describes a process for preparing a hydrotreating catalyst in which a support is impregnated with an impregnation solution comprising a Group VIB metal component, a Group VIII metal component, and, optionally, a phosphorus component. The support is dried at a temperature below 200° C., contacted with a polyol, and then dried again at a temperature below 200° C.

Japanese patent application 04-166233 describes substantially the same process as the above-mentioned patent application, except that instead of a polyol an alkoxycarboxylic acid is used.

Japanese patent application 06-339635 describes a process in which a support is impregnated with an impregnation solution comprising an organic acid, Group VIB and Group VIII hydrogenation metal components, and preferably a phosphorus component. The impregnated support is dried at a temperature below 200° C. The dried impregnated support is contacted with an organic acid or polyol, after which the thus treated support is dried at a temperature below 200° C.

Japanese patent application 06-210182 describes a process for preparing a catalyst in which a boria-alumina support comprising 3–15 wt. % of boria is impregnated with an impregnation solution comprising a Group VIB metal component, a Group VIII metal component, and a polyol. The impregnated support is dried at a temperature of 110° C. to form a catalyst.

Non-prepublished European patent application No. 99201051.2 in the name of Akzo Nobel filed on Apr. 8, 1999, describes a catalyst containing an organic compound comprising N and carbonyl.

In principle, any catalyst prepared by any process according to any one of the above references or otherwise which comprises a Group VIB hydrogenation metal, a Group VIII hydrogenation metal, and an organic additive on a carrier is suitable for use in the process of the present invention. As Group VIB metals may be mentioned molybdenum, tungsten, and chromium. Group VIII metals include nickel, cobalt, and iron. In the ultra-deep HDS process of the present invention, it is preferred to use a catalyst comprising molybdenum as Group VIB metal component and nickel and/or cobalt as Group VIII metal component. The use of nickel as Group VIII metal component is particularly preferred.

The catalyst usually has a metal content in the range of 0.1 to 50 wt. %, calculated on the dry weight of the catalyst not containing the additive. The Group VIB metal will frequently be present in an amount of 5–30 wt. %, preferably 15–25 wt. %, calculated as trioxide. The Group VIII metal will frequently be present in an amount of 1–10 wt. %, preferably 2–6 wt. %, respectively, calculated as monoxide. If so desired, the catalyst may also contain other components, such as phosphorus, halogens, and boron. Particularly, the presence of phosphorus in an amount of 1–10 wt. %, calculated as $P_2O_5$, can be preferred.

The catalyst carrier may comprise the conventional oxides, e.g., alumina, silica, silica-alumina, alumina with silica-alumina dispersed therein, silica-coated alumina, magnesia, zirconia, boria, and titania, as well as mixtures of these oxides. As a rule, preference is given to the carrier comprising alumina, silica-alumina, alumina with silica-alumina dispersed therein, or silica-coated alumina. Special preference is given to the carrier consisting essentially of alumina or alumina containing up to 20 wt. % of silica, preferably up to 10 wt. %. A carrier containing a transition alumina, for example an eta, theta, or gamma alumina is preferred within this group, with a gamma-alumina carrier being especially preferred.

The catalyst's pore volume (measured via mercury penetration) is not critical to the process according to the invention and will generally be in the range of 0.25 to 1 ml/g. The specific surface area is not critical to the process according to the invention either and will generally be in the range of 50 to 400 $m^2/g$ (measured using the BET method). Preferably, the catalyst will have a median pore diameter in the range of 7–15 nm, as determined by mercury porosimetry (contact angle 130°), and at least 60% of the total pore volume will be in the range of ±2 nm from the median pore diameter. This data is determined on the catalyst after it has been calcined for one hour at a temperature of 500° C.

The catalyst is suitably in the form of spheres or extrudates. Examples of suitable types of extrudates have been disclosed in the literature (see, int. al., U.S. Pat. No. 4,028,227). Highly suitable for use are cylindrical particles (which may be hollow or not) as well as symmetrical and asymmetrical polylobed particles (2, 3 or 4 lobes).

The organic additive present in the catalyst to be used in the process according to the invention before sulfidation may be any organic additive. Preferably the organic additive is selected from the group of compounds comprising at least two oxygen atoms and 2–10 carbon atoms and the compounds built up from these compounds. Organic compounds selected from the group of compounds comprising at least two oxygen-containing moieties, such as a carboxyl, carbonyl or hydroxyl moieties, and 2–10 carbon atoms and the compounds built up from these compounds are preferred. Examples of suitable compounds include citric acid, tartaric acid, oxalic acid, malonic acid, malic acid, butanediol, pyruvic aldehyde, glycolic aldehyde, and acetaldol. At this point in time, preference is given to an additive that is selected from the group of compounds comprising at least two hydroxyl groups and 2–10 carbon atoms per molecule, and the (poly)ethers of these compounds. Suitable compounds from this group include aliphatic alcohols such as ethylene glycol, propylene glycol, glycerin, trimethylol ethane, trimethylol propane, etc. Ethers of these compounds include diethylene glycol, dipropylene glycol, trimethylene glycol, triethylene glycol, tributylene glycol, tetraethylene glycol, tetrapentylene glycol. This range can be extrapolated to include polyethers like polyethylene glycol. For this last compound, polyethylene glycol with a molecular weight between 200 and 600 is preferred. Other ethers which are suitable for use in the present invention include ethylene glycol monobutyl ether, diethylene glycol monomethyl ether, diethylene glycol monoethyl ether, diethylene glycol monopropyl ether, and diethylene glycol monobutyl ether. Of these, ethylene glycol, diethylene glycol, triethylene glycol, tetraethylene glycol, proplylene glycol, dipropylene glycol and polyethylene glycol with a molecular weight between 200 and 600 are preferred.

Another group of compounds comprising at least two hydroxyl groups and 2–10 carbon atoms per molecule are the saccharides. Preferred saccharides include monosaccharides such as glucose and fructose. Ethers thereof include disaccharides such as lactose, maltose, and saccharose. Polyethers of these compounds include the polysaccharides.

A further group of additives are those compounds comprising at least one covalently bonded nitrogen atom and at least one carbonyl moiety. Examples include aminopolycarboxylic acids, such as nitrilo-triacetic acid and diethylene-triamine-pentaacetic acid. In this case the organic compound preferably comprises at least two nitrogen atoms and preferably at least two carbonyl moieties. It is further preferred that at least one carbonyl moiety is present in a carboxyl group. It is furthermore preferred that at least one nitrogen atom is covalently bonded to at least two carbon atoms. A preferred organic compound is a compound satisfying formula (I)

(R1R2)N—R3—N(R1'R2')     (I)

wherein R1, R2, R1' and R2' are independently selected from alkyl, alkenyl, and allyl with up to 10 carbon atoms optionally substituted with one or more groups selected from carbonyl, carboxyl, ester, ether, amino, or amido. R3 is an alkylene group with up to 10 carbon atoms which may be interrupted by —O— or —NR4—. R4 is selected from the same group as indicated above for R1. The R3 alkylene group may be substituted with one or more groups selected from carbonyl, carboxyl, ester, ether, amino, or amido. As has been set out above, it is essential that the organic compound of formula (I) comprises at least one carbonyl moiety.

Preferably, at least two of R1, R2, R1' and R2' have the formula —R5—COOX, wherein R5 is an alkylene group having 1–4 carbon atoms, and X is hydrogen or another cation, such as an ammonium, a sodium, a potassium, and/or a lithium cation. If X is a multivalent cation, one X can adhere to two or more —R5—COO groups. Typical examples of such a compound are ethylenediamine(tetra) acetic acid (EDTA), hydroxyethylenediaminetriacetic acid, and diethylenetriaminepentaacetic acid.

It is possible to use a single compound or a combination of compounds as additive.

The amount of additive present in the catalyst before sulfidation depends on the specific situation. It was found that the appropriate amount of additive generally lies in the range of 0.01–2.5 moles of additive per mole of hydrogenation metals present in the catalyst. If the amount of additive added is too low, the advantageous effect of the present invention will not be obtained. On the other hand, the addition of an exceptionally large amount of additive will not improve the effect of the present invention. It is well within the scope of the person skilled in the art to determine the optimum amount of additive to be used in each specific situation, depending also on the solubility and the viscosity of the additive.

The way in which the additive is incorporated into the catalyst composition is at present considered not critical to the process according to the invention. The additive can be incorporated into the catalyst composition prior to, subsequent to or simultaneously with the incorporation of the hydrogenation metal components.

For example, the additive can be incorporated into the catalyst composition prior to the hydrogenation metal components by being added to the carrier before the hydrogenation metal components are. This can be done by mixing the additive with the carrier material before it is shaped, or by impregnating the shaped carrier material with the additive.

It is also possible to incorporate the additive into the catalyst composition simultaneously with the hydrogenation metal components. This can be done, e.g., by mixing the additive and the hydrogenation metal components with the carrier material before shaping. However, a preferred way to incorporate the additive into the catalyst composition simultaneously with the hydrogenation metal components is by impregnating the carrier with an impregnation solution comprising the hydrogenation metal components and the additive, followed by drying under such conditions that at least part of the additive is maintained in the catalyst. This is the process described in EP 601 722.

It is also possible to incorporate the additive into the catalyst composition subsequent to the hydrogenation metal components. This can be done, e.g., by first incorporating the hydrogenation metal components into the catalyst composition, e.g., by mixing them with the carrier material or by impregnating the carrier with them, optionally followed by drying and/or calcining, and subsequently incorporating the additive, e.g., by impregnation. A preferred embodiment of this process is the embodiment described in WO 96/41848, in which first a catalyst composition is prepared by incorporating hydrogenation metal components into a catalyst composition, e.g., by impregnation of a carrier, after which the catalyst is subjected to a calcination step to convert the hydrogenation metal components into their oxides, followed by incorporating the additive into the catalyst composition by impregnation. In this embodiment it is possible, e.g., to composite a conventional hydrotreating catalyst comprising a hydrogenation metal component on a carrier with the additive. The conventional hydrotreating catalyst used in this process can be either a freshly prepared hydrotreating catalyst or a used hydrotreating catalyst which has been regenerated.

At present the catalysts prepared by the processes described in EP 0601 722 and WO 96/41848 are considered preferred.

The Sulfidation Step

The first step of the process according to the invention is to subject the additive-containing hydrotreating catalyst to a sulfiding step. In the context of the present specification, the indication sulfiding step or sulfidation step is meant to include any process step in which at least a portion of the hydrogenation metal components present in the catalyst is converted into the sulfidic form, either directly or after an activation treatment with hydrogen.

Suitable sulfidation processes are known in the art. Ex situ sulfidation processes take place outside the reactor in which the catalyst is to be used in hydrotreating hydrocarbon feeds. In such a process the catalyst is contacted with a sulfur compound, e.g. a polysulfide or elemental sulfur, outside the reactor and, if necessary, dried. In a second step, the material is treated with hydrogen gas at elevated temperature in the reactor, optionally in the presence of a feed, to activate the catalyst, i.e. bring it into the sulfided state.

In situ sulfidation processes take place in the reactor in which the catalyst is to be used in hydrotreating hydrocarbon feeds. Here, the catalyst is contacted in the reactor at elevated temperature with a hydrogen gas stream mixed with a sulfiding agent, such as hydrogen sulfide or a compound which under the prevailing conditions is decomposable into hydrogen sulfide. It is also possible to use a hydrogen gas stream combined with a hydrocarbon feed comprising a sulfur compound which under the prevailing conditions is decomposable into hydrogen sulfide. In the latter case it is possible to use a hydrocarbon feed comprising an added sulfiding agent (a so-called spiked feed), but it is also possible to use a sulfur-containing hydrocarbon feed without any added sulfiding agent, since the sulfur components present in the feed will be converted into hydrogen sulfide in the presence of the catalyst. The hydrocarbon feed may be the feed to be subjected to ultra-deep HDS in the process according to the invention, but it may also be a different feed, later to be replaced with the feed to be subjected to ultra-deep HDS. Combinations of the various sulfiding techniques may also be applied.

In the context of the present invention it is presently preferred to sulfide the catalyst by contacting it with an, optionally spiked, hydrocarbon feed.

The Feed

The feedstock suitable for use in the process according to the invention has a 95% boiling point, as determined in accordance with ASTM D-2887, of 450° C. or less, preferably 420° C. or less, more preferably 400° C. or less. That is, 95 vol. % of the feedstock boils at a temperature of 450° C. or less, preferably 420° C. or less, more preferably 400° C. or less. Generally, the initial boiling point of the feedstock is above 100° C., preferably above 180° C. The feed contains less than 500 ppm of sulfur, preferably 150–500 ppm of sulfur.

The feedstock to be used in the process according to the invention may be prepared by hydrodesulfurization of starting hydrocarbon feedstocks containing 0.1 wt. % or more of sulfur, preferably 0.2 to 3.5 wt. % of sulfur, more preferably 0.5 to 2.0 wt. % of sulfur. This starting feedstock generally has a 95% boiling point, as determined in accordance with ASTM D-2887, of 450° C. or less, preferably 420° C. or less, more preferably 400° C. or less. Generally, the initial boiling point of the feedstock is above 100° C., preferably above 180° C. The feedstock generally contains 20–1200 ppm nitrogen, preferably 30–800 ppm, more preferably 70–600 ppm. The metal content of the feedstock preferably is less than 5 ppm, more preferably less than 1 ppm (Ni+V). Examples of suitable starting feedstocks are feedstocks comprising one or more of straight run gas oil, light catalytically cracked gas oil, and light thermally cracked gas oil.

The above-mentioned starting hydrocarbon feedstock is subjected to hydrodesulfurization to reduce its sulfur content to a value below 500 ppm. This hydrodesulfurization process can be carried out using conventional hydrodesulfurization catalysts comprising a Group VIB metal component, a Group VIII metal component, and, optionally, phosphorus on a carrier comprising alumina. Suitable hydrodesulfurization catalysts are commercially available, and include for example KF 756 and KF 901 of Akzo Nobel. It is also possible to obtain the feedstock for the process according to the invention from a starting feedstock containing more sulfur by means of a two-step process, such as those described in EP 0 464 931, EP-A 0 523 679 or EP 870 807.

Additionally, it is also possible to obtain the feedstock for the process of the invention from the above-mentioned starting feedstock by using an additive-based catalyst. The present invention thus also relates to a two-step process for converting a starting feedstock having a sulfur content of above 0.1 wt. % into a product having a sulfur content of 200 ppm or less, wherein the process comprises sulfidation of a first and a second catalyst comprising a Group VIB metal component, a Group VIII metal component, and an organic additive on a carrier, contacting a feedstock with a 95% boiling point of 450° C. or less and a sulfur content of 0.1 wt. % or more with the first sulfided catalyst under conditions of elevated temperature and pressure to form a product with a sulfur content of less than 500 ppm, and contacting the effluent from the first catalyst, optionally after fractionation or intermediate phase separation, optionally including removal of $H_2S$ and $NH_3$ formed, with the second sulfided catalyst under conditions of elevated temperature and pressure to form a product with a sulfur content of less than 200 ppm.

In this process, the first and second catalysts containing an organic additive before sulfidation may be the same or different. It is considered preferred at this point in time for the first catalyst to comprise molybdenum as Group VIB metal component and cobalt and/or nickel as Group VIII metal component, with the second catalyst comprising molybdenum as Group VIB metal component and nickel as Group VIII metal component. The two-step process can be carried out in one or two reactors, as may be desired.

The Process Conditions

The process according to the invention is carried out at elevated temperature and pressure. The temperature generally is 200–450° C., preferably 280–430° C. The reactor inlet hydrogen partial pressure generally is 5–200 bar, preferably 10–100 bar, more preferably 10–50 bar. The liquid hourly space velocity preferably is between 0.1 and 10 vol./vol.h, more preferably between 0.5 and 4 vol./vol.h. The $H_2$/oil ratio generally is in the range of 50–2000 Nl/l, preferably in the range of 80–1000 Nl/l.

The process conditions are selected in such a way that the sulfur content of the total liquid effluent is less than 200 ppm, preferably less than 100 ppm, more preferably less than 50 ppm. The exact process conditions will depend, int. al., on the nature of the feedstock, the desired degree of hydrodesulfurization, and the nature of the catalyst. In general, a higher temperature, a higher hydrogen partial pressure, and a lower space velocity will decrease the sulfur content of the final product. The selection of the appropriate process conditions to obtain the desired sulfur content in the product is well within the scope of the person skilled in the art of hydroprocessing.

The following examples are presented to illustrate the process of this invention. The examples are not intended to unduly restrict the scope and spirit of the claims attached hereto.

EXAMPLE 1

Nickel-Molybdenum Catalysts in Ultra-Deep HDS

Preparation of Additive-Containing Catalyst

Extrudates of a gamma-alumina carrier were impregnated to pore volume saturation with an impregnation solution comprising a molybdenum compound, a nickel compound, phosphoric acid, and diethylene glycol, after which the impregnated carrier was dried at a temperature of 140° C. for a period of 16 hours. The final catalyst contained 20 wt. % of molybdenum, calculated as trioxide, 5 wt. % of nickel, calculated as oxide, and 5 wt. % of phosphorus, calculated as $P_2O_5$. All weight percentages are calculated on the dry catalyst base, not including the additive. The molar ratio between DEG and the total of Ni and Mo is 0.4.

Preparation of Comparative Catalyst

A catalyst was prepared in the manner described above, except that the impregnation was carried out in the absence of DEG, and that the impregnated catalyst was subjected to a calcination step at 420° C. for 1 hour. The catalyst had the same composition as that described above, except for the absence of DEG.

The two catalysts were tested side by side in an upflow tubular reactor. Each reactor tube contained 75 ml of catalyst homogeneously intermixed with 70 ml of carborundum particles.

The catalysts were sulfided using an SRLGO in which dimethyl disulfide had been dissolved to a total S content of 2.5 wt. %.

The feed applied was a diesel feedstock with the following properties.

| Nitrogen (ASTM D-4629) (ppmwt) | 28 |
| Sulfur (ASTM D-4294) (ppmwt) | 219 |
| Density 15° C.(g/ml) | 0.8490 |
| Dist. (° C.) | ASTM D-2887* |
| IBP | 161 |
| 5 vol. % | 203 |
| 10 vol. % | 222 |
| 30 vol. % | 265 |
| 50 vol. % | 292 |
| 70 vol. % | 320 |
| 90 vol. % | 360 |
| 95 vol. % | 378 |
| FBP | 423 |

The catalysts were tested under five test conditions. Conditions 1 and 3 are the same. Conditions 4 and 5 differ from Condition 1 in terms of the pressure applied. Condition 2 differs from the first test condition in that the feed was spiked with 1 wt. % of S, added as dimethyl disulfide and 100 ppm N added as t-butyl amine. This was done to simulate the conditions halfway down a commercial unit, where the feed contacting the catalyst contains ammonia and hydrogen sulfide generated in the first part of the unit.

The reaction was carried out at a temperature of 323° C., a H2/oil ratio of 300Nl/l, and a LHSV of 2.0 h−1. The reaction time and pressure are listed in the following table.

| Condition | Feed | Pressure (bar) | Time (h) |
| --- | --- | --- | --- |
| 1 | F1 | 30 | 48 |
| 2 | F1 + S + N | 30 | 24 |
| 3 | F1 | 30 | 24 |
| 4 | F1 | 60 | 24 |
| 5 | F1 | 15 | 48 |

The products from the different runs were analyzed. The results thereof are given below.

Sulfur analysis of products obtained

| Condition | ppm S in the product produced by the catalyst according to the invention | ppm S in the product produced by the comparative catalyst |
| --- | --- | --- |
| 1 | 20 | 48 |
| 2 | 79 | 102 |
| 3 | 12 | 35 |
| 4 | <5 | <5 |
| 5 | 37 | 72 |

It appears that the catalyst according to the invention shows a much improved sulfur removal.

Nitrogen analysis of products obtained

| Condition | ppm N in the product produced by the catalyst according to the invention | ppm N in the product produced by the comparative catalyst |
| --- | --- | --- |
| 1 | <5 | 8 |
| 2 | <5 | 5 |
| 3 | <5 | <5 |
| 4 | <5 | <5 |
| 5 | 15 | 20 |

It appears that the catalyst according to the invention shows an improved nitrogen removal.

Total aromatics analysis of total liquid product

| Condition | wt. % aromatics in the product produced by the catalyst according to the invention | wt. % aromatics in the product produced by the comparative catalyst |
| --- | --- | --- |
| 1 | 35.7 | 36.7 |
| 2 | 36.0 | 36.5 |
| 3 | 35.5 | 36.5 |
| 4 | 28.7 | 32.9 |
| 5 | 37.1 | 37.3 |

It appears that the catalyst according to the invention shows improved aromatics removal under all conditions.

Polynuclear aromatics (PNA) analysis of total liquid product

| Condition | wt. % PNA in the product produced by the catalyst according to the invention | wt. % PNA in the product produced by the comparative catalyst |
| --- | --- | --- |
| 1 | 4.5 | 4.8 |
| 2 | 4.9 | 4.9 |
| 3 | 4.4 | 4.6 |
| 4 | 1.6 | 2.2 |
| 5 | 8.3 | 8.4 |

It appears that the catalyst according to the invention shows improved polynuclear aromatics removal.

EXAMPLE 2

Cobalt-Molybdenum Catalysts in Ultra-Deep HDS

A set of comparative catalysts which are comparable to those of Example 1, except that the catalysts contained cobalt instead of nickel, was prepared and tested. It appeared that also in this comparison the catalyst according to the invention, which before sulfiding contained an additive, showed better results than the comparative catalyst, albeit that both for the catalyst according to the invention and for the comparative catalyst the results of the nickel-containing catalyst of Example 1 were better than the results of the comparable cobalt-containing catalyst of this example.

What is claimed is:

1. An ultra-deep hydrodesulfurization process for reducing the content of sulfur compounds comprising alkylated benzothiophenes in a hydrocarbon feedstock to a sulfur content of less than 50 ppm, comprising subjecting a catalyst comprising a molybdenum component, a nickel component, and an organic additive on a carrier to a sulfidation step, and contacting a feedstock with a 95% boiling point of 450° C. or less and a sulfur content of 500 ppm or less with the sulfided catalyst under conditions of elevated temperature and pressure to form a product with a sulfur content of less than 50 ppm.

2. The process of claim 1 wherein the organic additive is at least one compound selected from the group consisting of compounds comprising at least two hydroxyl groups and 2–10 carbon atoms, and the ethers and polyethers of these compounds.

3. The process of claim 2 wherein the additive is at least one compound selected from the group consisting of ethylene glycol, diethylene glycol, triethylene glycol, tetraethylene glycol, proplylene glycol, dipropylene glycol and polyethylene glycol with a molecular weight between 200 and 600.

4. The process of claim 2 wherein the additive is a saccharide or a polysaccharide.

5. The process of claim 1 wherein the additive comprises a compound comprising at least one covalently bonded nitrogen atom and at least one carbonyl moiety.

6. The process of claim 1 wherein the sulfidation step is carried out in situ, optionally using the feed which is to be subjected to ultra-deep HDS with the sulfided catalyst.

7. An ultra-deep two-step hydrodesulfurization process for reducing the content of sulfur compounds comprising alkylated benzothiophenes in a starting feedstock having a sulfur content of above 0.1 wt. % into a product having a sulfur content of 50 ppm or less, wherein the process comprises sulfidation of a first and a second catalyst said first catalyst comprising a Group VIB metal component, a Group VII metal component, and an organic additive on a carrier, and said second catalyst comprising a molybdenum component, a nickel component and an organic additive on a carrier, contacting a feedstock with a 96% boiling point of 450° C. or less and a sulfur content of 0.1 wt. % or more with the first sulfided catalyst under conditions of elevated temperature and pressure to form a product with a sulfur content of less than 500 ppm, and contacting the effluent from the first catalyst, optionally after fractionation or intermediate phase separation, with the second sulfided catalyst under conditions of elevated temperature and pressure to form a product with a sulfur content of less than 50 ppm.

* * * * *